United States Patent
Ng et al.

(10) Patent No.: US 9,229,576 B2
(45) Date of Patent: Jan. 5, 2016

(54) APPARATUS AND METHOD FOR PREVENTING FALSE TOUCHES IN TOUCH SCREEN SYSTEMS

(71) Applicant: STMICROELECTRONICS ASIA PACIFIC PTE LTD (SINGAPORE), Singapore (SG)

(72) Inventors: HonSiong Ng, Singapore (SG); Praveesh Chandran, Singapore (SG); Mythreyi Nagarajan, Singapore (SG); Ravi Bhatia, Singapore (SG)

(73) Assignee: STMicroelectronics Asia Pacific PTE Ltd, Singapore (SG)

( * ) Notice: Subject to any disclaimer, the term of this patent is extended or adjusted under 35 U.S.C. 154(b) by 259 days.

(21) Appl. No.: 13/648,149

(22) Filed: Oct. 9, 2012

(65) Prior Publication Data

US 2014/0098032 A1    Apr. 10, 2014

(51) Int. Cl.
*G06F 3/041*    (2006.01)
(52) U.S. Cl.
CPC .................. *G06F 3/0418* (2013.01)
(58) Field of Classification Search
CPC .............. G06F 3/044; G06F 3/0418; G06F 2203/04104; G06F 3/03547
USPC ............ 345/173–174; 178/18.01–18.06
See application file for complete search history.

(56) References Cited

U.S. PATENT DOCUMENTS

| | | | |
|---|---|---|---|
| 6,998,545 B2 * | 2/2006 | Harkcom et al. | 178/18.02 |
| 8,797,277 B1 * | 8/2014 | Grygorenko | 345/173 |
| 2008/0024455 A1 * | 1/2008 | Lee et al. | 345/173 |
| 2008/0277171 A1 * | 11/2008 | Wright | 178/18.06 |
| 2009/0008161 A1 * | 1/2009 | Jones et al. | 178/18.06 |
| 2009/0184932 A1 * | 7/2009 | Alten | 345/173 |
| 2009/0284490 A1 * | 11/2009 | Chen | 345/174 |
| 2010/0066701 A1 * | 3/2010 | Ningrat | 345/174 |
| 2011/0120784 A1 * | 5/2011 | Osoinach et al. | 178/18.06 |
| 2011/0216016 A1 * | 9/2011 | Rosener | 345/173 |
| 2011/0241907 A1 * | 10/2011 | Cordeiro | 341/20 |
| 2012/0043976 A1 * | 2/2012 | Bokma et al. | 324/679 |
| 2012/0056822 A1 * | 3/2012 | Wilson et al. | 345/173 |
| 2013/0249852 A1 * | 9/2013 | Lin et al. | 345/174 |

OTHER PUBLICATIONS

IEEE Recommended Practice for Powering and Grounding Electronic Equipment, IEEE Std 1100-2005 (Revision of IEEE Std 1100-1999), vol., No., pp. 1,703, May 24, 2006 (see chart on p. 57).*
Ming-Dou Ker; Wan-Yen Lin; Cheng-Cheng Yen; Che-Ming Yang; Tung-Yang Chen; Shih-Fan Chen, "New transient detection circuit for electrical fast transient (EFT) protection design in display panels," IC Design and Technology (ICICDT), 2010 IEEE International Conference on, pp. 51-54, Jun. 2-4, 2010.*
Ming-Dou Ker; Cheng-Cheng Yen, "New Transient Detection Circuit for On-Chip Protection Design Against System-Level Electrical-Transient Disturbance," Industrial Electronics, IEEE Transactions on, vol. 57, No. 10, pp. 3533-3543, Oct. 2010.*

* cited by examiner

*Primary Examiner* — Lun-Yi Lao
*Assistant Examiner* — Elliott Deaderick
(74) *Attorney, Agent, or Firm* — Slater & Matsil, L.L.P.

(57) ABSTRACT

A method comprises during a frame period finding a first EFT noise influenced sensor of a touch screen panel, determining whether the first EFT noise influenced sensor is located at a last transmitting/driving line of the touch screen panel, designating the frame period as a noise influenced frame period using an absolute value threshold if the first EFT noise influenced sensor is not located at the last transmitting/driving line and designating the frame period as the noise influenced frame period using a percentage threshold if the first EFT noise influenced sensor is located at the last transmitting/driving line.

20 Claims, 3 Drawing Sheets

APPARATUS AND METHOD FOR PREVENTING FALSE TOUCHES IN TOUCH SCREEN SYSTEMS

TECHNICAL FIELD

The present invention relates to an apparatus method for reducing noise interference in touch screen systems, and, in particular embodiments, to a mechanism for determining false touches induced by electrical fast transient (EFT) noise.

BACKGROUND

A variety of touch screen devices including personal digital assistants (PDA), tablet computers, mobile phones, kiosks, handheld gaming consoles and the like have become popular. A touch screen device may comprise a pressure sensitive transparent panel overlaying a display such as a liquid crystal display (LCD) screen. The pressure sensitive transparent panel is capable of detecting the pressure from a finger touch and forwarding the detected signal to a processor coupled to the panel. The processor may process the detected signal and determine whether there is a finger touch and the location of the finger touch.

The prevailing touch screen technologies may be divided into two categories, namely resistive touch screen techniques and capacitive touch screen techniques. A touch screen system based upon a resistive touch screen technique may comprise two conductive layers, which are separated from each other by an air gap when there is no touch present on the surface of the resistive touch screen. When a finger touches the screen, the pressure may cause two conductive layers to contact each other so that the resistance between the two conductive layers is lowered down as a result. A sensing circuit may detect the resistance variation and determine the location of the finger touch accordingly.

A capacitive touch screen may comprise a plurality of transmit lines $T_X$ and receive lines $R_X$ arranged in rows and columns. The transmit lines may be coupled to a signal source and arranged in parallel in a first direction. The receive lines may be coupled to a sensing circuit and arranged in parallel in a second direction. The first direction is orthogonal to the second direction. Therefore, the transmit lines may intersect with the receive lines to form a plurality of capacitors. As a finger touches a point of the capacitive touch screen, the capacitance at the point may vary as a result. Such capacitance variation at that point causes a change of the detected signal at the sensing circuit coupled to the receive lines. As a result, the sensing circuit may determine whether there is a finger touch. Furthermore, if a finger touch exists, the sensing circuit may detect the location of the finger touch.

The touch screen devices may be powered by a battery charger when a rechargeable battery of the touch screen device is depleted. However, the battery charger may cause noise interference. In particular, the battery charger is coupled to a utility power line. The noise from the utility power line may penetrate into the touch screen system and contaminate the transmit lines TX through the battery charger. For example, when a battery charger is connected to a touch screen system, intermittent bursts of noise may occur at electrodes of the touch screen. This kind of intermittent bursts of noise is commonly known as electrical fast transient (EFT) noise, which may trigger false finger touches. In order to prevent EFT noise from falsely triggering a finger touch event, a touch screen system may take a variety of EFT noise tests before the design of the touch screen system is finalized. The EFT noise test should be conducted under conditions specified by IEC 61000-4-4.

SUMMARY OF THE INVENTION

These and other problems are generally solved or circumvented, and technical advantages are generally achieved, by preferred embodiments of the present invention which provide an apparatus and method for preventing false finger touches induced by various noise sources including electrical fast transient (EFT) noise.

In accordance with an embodiment, a method comprises scanning a touch screen panel from a first corner to a second corner, wherein the touch screen panel comprises a plurality of sensors arranged in rows and columns and the first corner is diagonally opposite to the second corner. The method further comprises determining whether a sensor is affected by EFT noise; and considering a frame as a noise influenced frame if a total number of sensors affected by EFT noise is greater than a first noise threshold.

In accordance with another embodiment, a method comprises finding a first EFT noise influenced sensor of a touch screen panel, determining whether the first EFT noise influenced sensor is located at a last transmitting/driving line of the touch screen panel, designating the frame period as a noise influenced frame period using an absolute value threshold if the first EFT noise influenced sensor is not located at the last transmitting/driving line and designating the frame period as the noise influenced frame period using a percentage threshold if the first EFT noise influenced sensor is located at the last transmitting/driving line.

In accordance with yet another embodiment, a system comprises a touch screen panel comprising a plurality of sensors arranged in rows and columns, wherein each sensor comprises a transmit node carrying a current and a receive node, wherein the transmit node and the receive node form a capacitor.

The system further comprises a receiver coupled to the receive node and a processor coupled to the receiver, wherein the processor is configured to find a first EFT noise influenced sensor of the touch screen panel, determine whether the first EFT noise influenced sensor is located at a last transmitting/driving line of the touch screen panel, designate a touch frame as a noise influenced frame using an absolute value threshold if the first EFT noise influenced sensor is not located at the last transmitting/driving line and designate the touch frame as the noise influenced frame using a percentage threshold if the first EFT noise influenced sensor is located at the last transmitting/driving line.

An advantage of an embodiment of the present invention is preventing false touches induced by electrical fast transient (EFT) noise so as to immunize a touch screen system against noise from various sources including ESD events, battery charger and switching regulator induced noise and/or the like.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
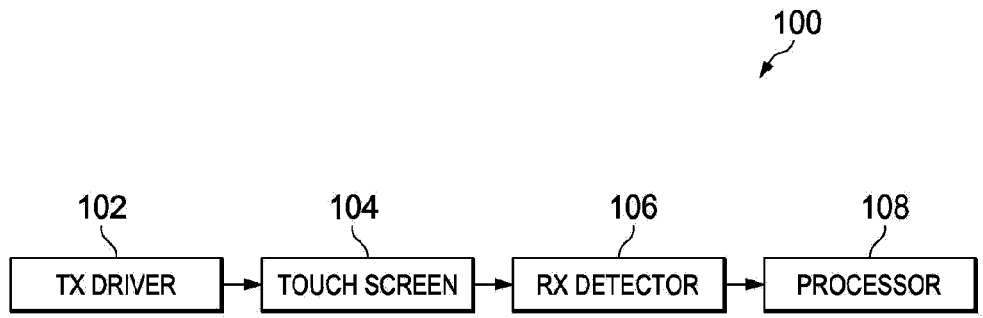
FIG. 1 illustrates a block diagram of a touch screen device in accordance with an embodiment.

The present disclosure will be described with respect to embodiments in a specific context, a method for preventing electrical fast transient (EFT) noise triggered false touches. The embodiments of the disclosure may also be applied, however, to a variety of noise induced false touches. Hereinafter, various embodiments will be explained in detail with reference to the accompanying drawings FIG. 1 illustrates a block diagram of a touch screen device in accordance with an embodiment. The touch screen device 100 may include a $T_X$ driver 102, a touch screen panel 104, a $R_X$ detector 106 and a processor 108. The touch screen panel 104 may be a touch sensitive device up to 10 inches with multi-touch capability. The touch screen panel 104 may comprise a plurality of sensitive elements (a.k.a. sensors) on the surface of the touch screen panel 104. Each sensitive element is a capacitor, which is formed by an intersection between a transmit line and a receive line. The transmit line is driven by a voltage from the $T_X$ driver 102. The voltage may generate an electrical charge at each sensing element. The electrical charge of a sensing element is proportional to the capacitance of the sensing element.

The $R_X$ detector 106 may comprise a capacitance sensing circuit coupled to the capacitance sensing elements of the touch screen panel 104. The capacitance sensing circuit may be implemented by using any suitable circuits that form a part of Analog Front End (AFE).

Without a finger touch, the $R_X$ detector 106 may detect the baseline capacitance of the touch screen panel. After a finger touch applied to the surface of the touch screen panel 104, the capacitance at the point where the finger touches may vary accordingly. Such capacitance variation may change the amount of charge at the capacitor of the touch point. As a result, the $R_X$ detector 106 detects the variation of capacitance through receiving a signal different from the signal of the baseline.

The $R_X$ detector 106 may forward the detected signal to the processor 108 wherein the detected signal is further processed based upon a predetermined threshold. It should be noted that the $R_X$ detector 106 may scan the touch screen panel 104 and collect each location's response. Based upon the response of each location, the processor may determine the precise location of the finger touch. It should further be noted that, for simplicity, only a simplified version of a touch screen device is illustrated in FIG. 1. A person skilled in the art will recognize that in order to achieve a fully functional touch screen system, other necessary parts such as input/output circuits, filters and the like may be needed.

Figure 2:
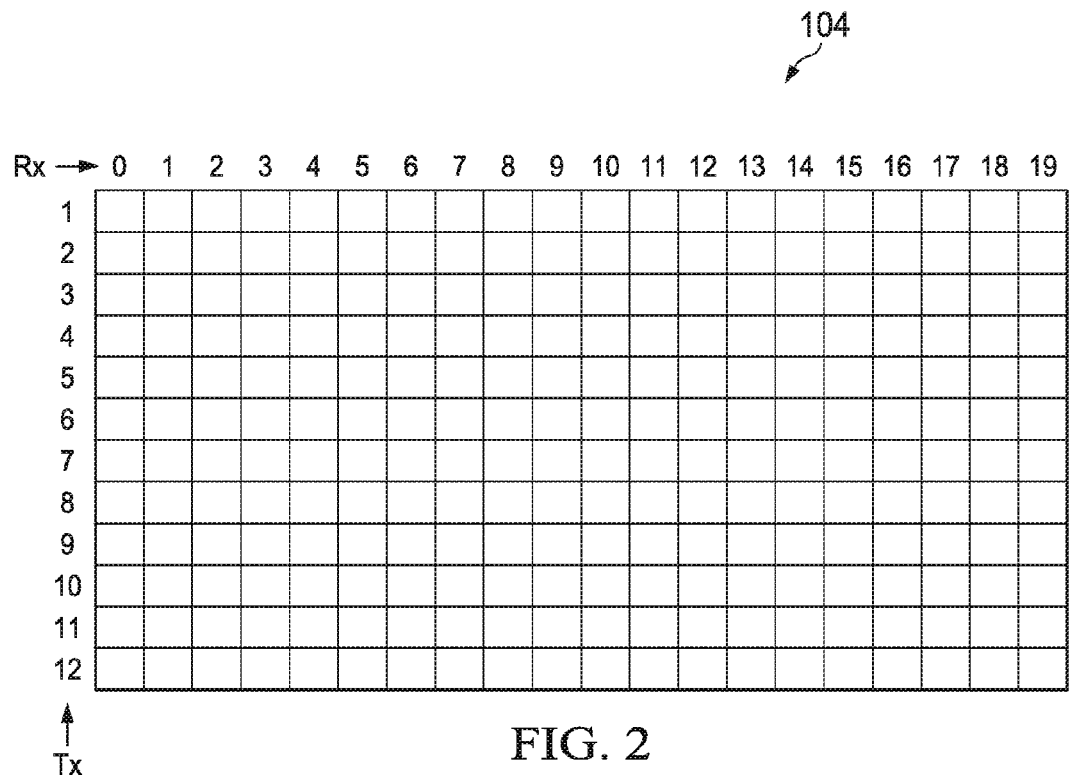
FIG. 2 illustrates a touch screen panel including a plurality of sensors in accordance with an embodiment.

FIG. 2 illustrates a touch screen panel including a plurality of sensors in accordance with an embodiment. The touch screen panel 104 may comprise a plurality of sensors arranged in rows and columns. As shown in FIG. 2, there may be 20 receive lines $R_X$ arranged in parallel vertically. Likewise, there may be 12 transmit lines $T_X$ arranged in parallel horizontally. Each intersection between a transmit line and a receive line forms a sensor (a.k.a. a sensing element or a touch point). As such, the touch screen panel 104 may be of 240 sensors. Without a finger touch, the detected signal from a sensor is commonly referred to as a baseline of the sensor. In accordance with an embodiment, the baseline of the sensors of the touch screen panel 104 may be about 1000.

It should be noted that the baseline is a reference value, which is proportional to the capacitance at a touch point of the touch screen panel when no touch is present. It should further be noted that the baseline's value does not have a unit because the unit of the baseline is in digitized counts or codes. In other words, the baseline represents a digitized output of the capacitance between a $T_X$ line and a $R_X$ line of the touch screen panel 104.

The touch screen panel 104 is coupled to the processor (not shown but illustrated in FIG. 1). The processor may detect a touch as well as the location of the touch through analyzing a frame of the touch screen panel 104. The frame is a sample period in which the outputs of all touch points of the panel are reported to the processor. Upon the expiration of the sample period, a new frame is created subsequently. The processor may detect a finger touch through analyzing a plurality of successive frames. In accordance with an embodiment, the time period of a frame is about 10 ms.

Figure 3:
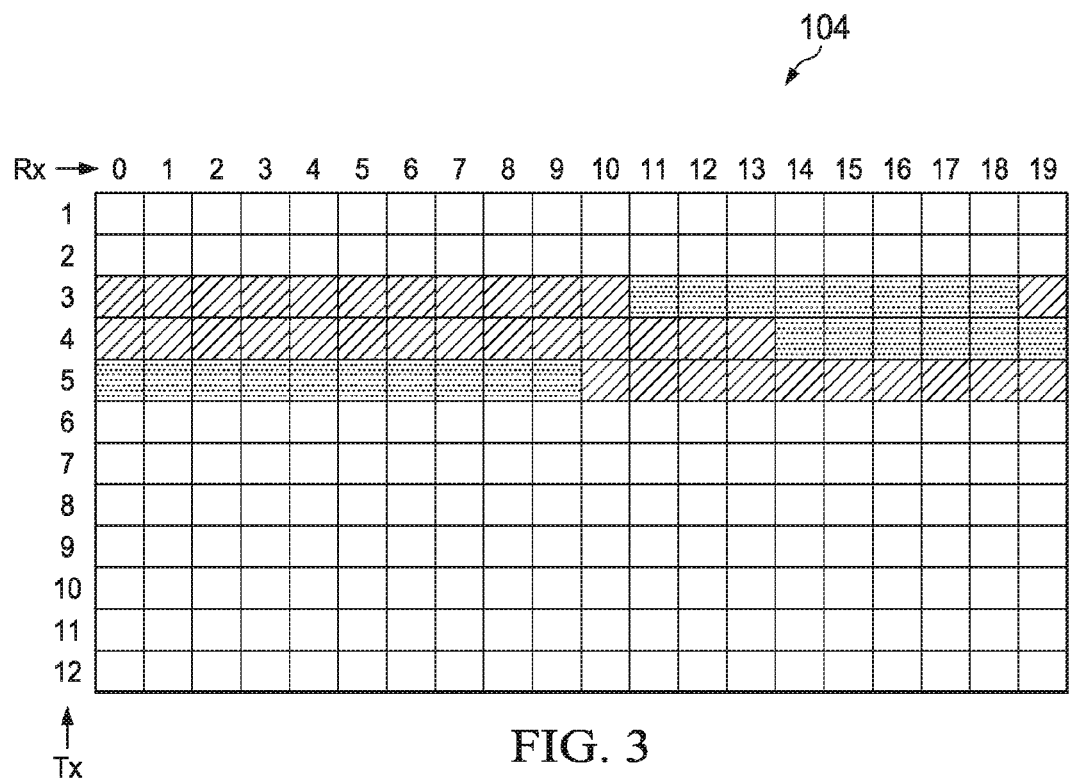
FIG. 3 illustrates a first method for preventing a false finger touch during an electrical fast transient (EFT) noise test in accordance with an embodiment.

FIG. 3 illustrates a first method for preventing a false finger touch during an EFT noise test in accordance with an embodiment. When an EFT noise test is applied to a touch screen panel, several rows of the sensors of the touch screen panel may be affected. More particularly, some sensors influenced by EFT noise may be a positive strength signal. Some sensors influenced by EFT noise may be a negative strength signal. However, the sensing circuit of the touch screen panel may receive an absolute value of the detected signal through a digitized process.

The signal strength may be used as an EFT noise threshold to detect a noise triggered touch. In accordance with an embodiment, as described above with respect to FIG. 2, the baseline of the sensors is about 1000. When a finger touches a point of the screen, the sensor at the point may generate a response different from the baseline. In accordance with an embodiment, the sensor's response is about 600.

On the other hand, the signal strength of an EFT noise trigger signal may be of a positive deviation or a negative deviation from the baseline. Because the receiver receives an absolute value of the noise triggered signal, both the positive deviation and the negative deviation may generate a same effect at the receiver so that they may share a same EFT noise threshold. In accordance with an embodiment, an EFT noise threshold is measured from the baseline of the touch screen panel. The EFT strength threshold is about 900.

It should be noted that the receiver may detect a capacitance variation from the baseline based upon the first threshold. However, the receiver may not be able to distinguish a noise signal from a finger touch based upon the EFT strength threshold because the finger touch's response may exceed the EFT strength threshold. A time period threshold described below will be used to distinguish noise triggered signals from finger touch signals.

In addition, in order to reliably detect the EFT noise triggered responses, a hysteresis control mechanism may be employed. In particular, a hysteresis band is set at the EFT strength threshold. In accordance with an embodiment, the hysteresis band is about half of the EFT strength threshold. In other words, the hysteresis band is in range from about −50 to about 50 around the EFT strength threshold.

The processor detects a first noise triggered signal based upon a predetermined threshold (e.g., 900). After detecting the first noise triggered signal, the processor uses a hysteresis band to adjust the threshold. For example, after detecting the first noise triggered signal, the processor may set the EFT strength threshold around 950. In other words, any signal having strength less than 950 is considered as a further noise triggered signal.

In order to distinguish a finger touch from an EFT noise triggered touch, one additional threshold is employed to detect an EFT noise triggered touch.

The total number of points having a capacitance variation may be used as a threshold for detecting a noise triggered touch frame. In a finger touch, there are few points of the touch panel having a capacitance variation. Normally, the total points having a capacitance variation may be less than 10. On the other hand, there are more than 40 points of the touch panel having a capacitance variation when an EFT noise triggered touch occurs. Therefore, the total number of points having a capacitor variation may be used as a threshold. The detailed procedure of applying the second threshold is described below.

The $R_X$ receiver scans the touch screen panel 104 from the upper left corner to the bottom right corner. In FIG. 3, the sensors receiving a noise triggered signal having positive strength are drawn in a small checkerboard pattern. On the other hand, some sensors influenced by EFT noise may be of a detected signal having negative strength. In FIG. 3, the sensors receiving a signal having negative strength are drawn in an upward diagonal pattern. It should be noted under an EFT noise test, the signals having negative strength and positive strength may occur simultaneously. In other words, the $R_X$ detector may detect both positive strength signals and negative strength signals. In addition, the sensors influenced by EFT noise may be adjacent to each other to form a noise affected region comprising a plurality of sensors as shown in FIG. 3.

After finding a first EFT noise triggered response, a processor may label the location of the sensor as shown in FIG. 3. The processor may count the total number of sensors affected by EFT noise. If the total number of the sensors is greater than 40, the processor considers the touch frame as a false touch triggered by EFT noise. As a result, the process may discard this touch frame because it is a noise triggered touch.

Figure 4:
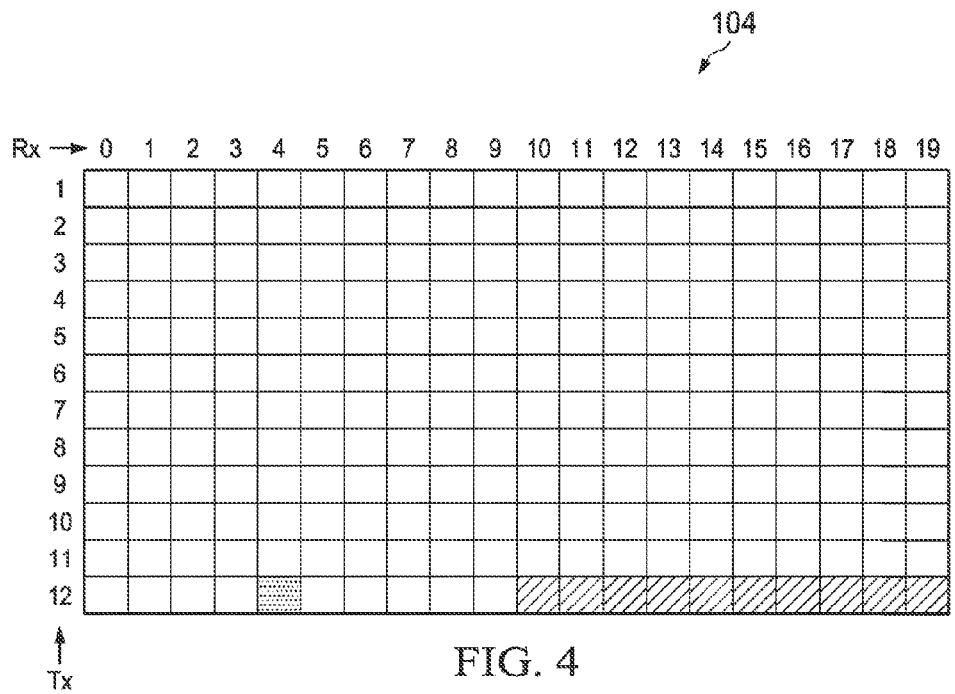
FIG. 4 illustrates a second method for preventing a false finger touch during an EFT noise test in accordance with an embodiment.

FIG. 4 illustrates a second method for preventing a false finger touch during an EFT noise test in accordance with an embodiment. The EFT noise triggered responses may occur at the last transmitting/driving line of the touch screen panel 104. As shown in FIG. 4, the last row of the touch screen panel is alternatively referred to as the last transmitting/driving line of the touch screen panel 104. The method described above with respect to FIG. 3 may not be applicable because there are not enough samples left after finding a first sensor influenced by EFT noise. As shown in FIG. 4, the first EFT noise triggered response occurs at the fifth sensor of the last transmitting/driving line of the touch screen panel 104.

After finding the first EFT noise triggered response located at the last transmitting/driving line of the touch screen panel, the processor may not use the total number described above to determine whether it is an EFT noise triggered event. Instead, the processor may calculate the percentage of the EFT noise triggered samples. For example, after finding the first EFT noise triggered response occurs at the fifth sensor of the last transmitting/driving line of the touch screen panel 104, the processor collects the responses from the sixth sensor to the last sensor of the last transmitting/driving line. If the percentage of the EFT noise triggered samples is greater than 60%, the processor considers the responses at those sensors triggered by EFT noise rather than a finger touch.

Figure 5:
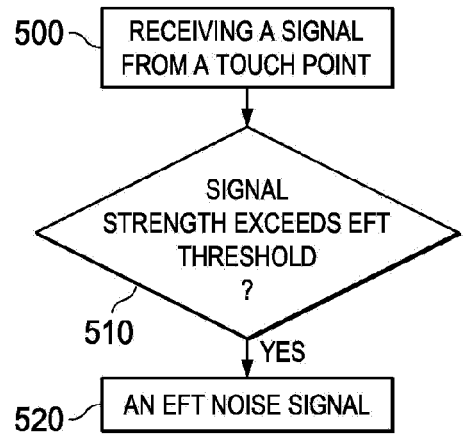
FIG. 5 illustrates a flow chart of finding an EFT noise triggered signal in accordance with an embodiment.

FIG. 5 illustrates a flow chart of finding an EFT noise triggered signal in accordance with an embodiment. At step 500, a processor of a touch screen panel receives a signal of a touch point of the panel through a sensing circuit coupled between the processor and a sensing element of the touch screen panel. The signal is proportional to a capacitance variation at the sensing element, which has a baseline around 1000.

At step 510, the processor compares the signal strength with a predetermined threshold, which is about 900 and has a hysteresis band from 900 to 950 in accordance with an embodiment. If the signal strength does not exceed the predetermined threshold (e.g., 900), the processor bypasses the signal and waits for processing the next signal. On the other hand, after the processor detects a first noise trigger signal, the EFT strength threshold is set at 950. Any signals having a strength less than 950 are considered as noise triggered signals.

It should be noted that the signal strength of a finger touch signal may exceed the EFT strength threshold. According to an embodiment, the signal strength of a finger touch is less than 600. After finding a signal having signal strength less than 600, the processor may employ a de-bouncing process to filter out transient signals. More particularly, the processor may select a time period of 100 ms (approximately 10 time frames) for de-bouncing purposes. That is, if the strength of a signal is below 600, the processor has to wait about 10 frames later before consider a frame as a finger touch frame.

At step 520, after finding the signal strength exceeds the threshold, the processor treats the signal as a noise triggered signal. It should be noted that the flow chart shown in FIG. 5 is only used to determine whether a signal is noise triggered. In order to determine whether a touch frame is noise triggered, more touch points and their corresponding signals should be processed. The detailed process is illustrated below with respect to FIG. 6.

It should be noted that while FIG. 5 illustrate a method for detecting a noise triggered signal, a person having ordinary skill in the art will recognize many alternatives. For example, various step as illustrated in FIG. 5 may added, removed, replaced, rearranged, repeated, overlapped, and/or partially overlapped.

It should further be noted that there are many different touch sensing technologies available. However, the method of detecting a noise triggered signal illustrated in FIG. 5 is not tied to a particular sensing technique. The sensing technique described herein is limited solely for the purpose of clearly illustrating the inventive aspects of the various embodiments. Any suitable sensing techniques may be used, and all such sensing techniques are fully intended to be included within the scope of the embodiments discussed herein.

Figure 6:
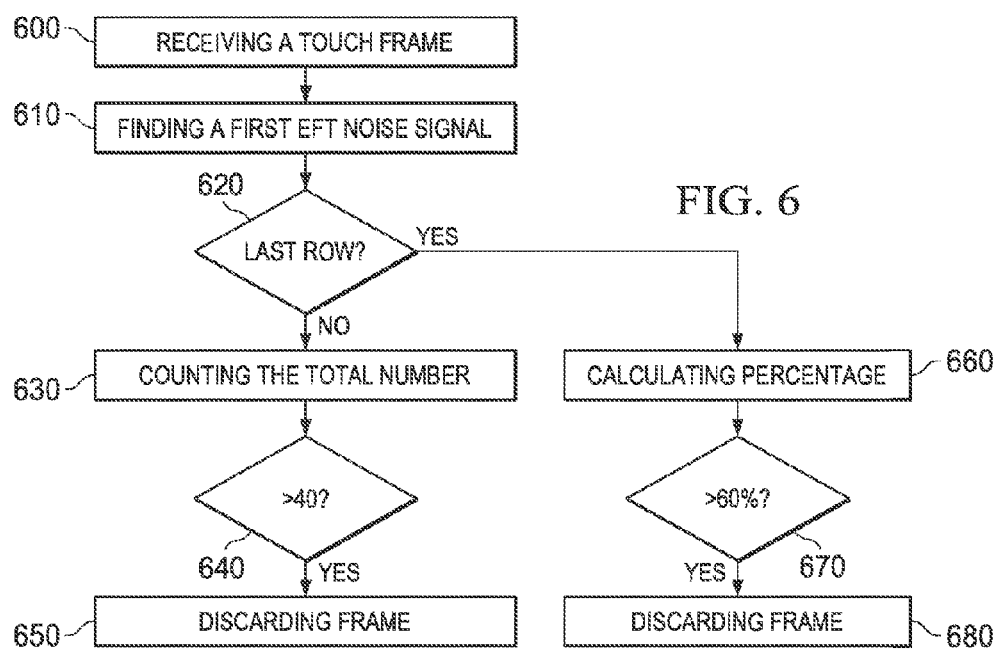
FIG. 6 illustrates a flow chart of finding an EFT noise triggered touch frame in accordance with an embodiment.

FIG. 6 illustrates a flow chart of finding an EFT noise triggered touch frame in accordance with an embodiment. At step 600, a processor of a touch screen panel receives a touch frame. The processor scans the touch screen panel from an upper left corner to a bottom right corner. The scanning time period is about 5 ms. The processing time for analyzing the scanning results is about 5 ms. The total time for analyzing a touch frame is about 10 ms. After analyzing the touch frame, the processor will determine whether the touch frame is noise triggered.

It should be noted that the signals received by the processor are raw data. In other words, the x-y locations of the signals have not been determined yet. The method herein is capable of achieving a noise rejection prior to digital filtering, which is a common step of processing signals from a touch screen panel.

At step 610, the processor detects a first noise triggered signal. The detailed process of detecting a noise triggered signal has been described above with respect to FIG. 5, and hence is not discussed again herein to avoid repetition.

At step 620, the processor determines whether the noise triggered signal is located at the last transmitting/driving line of the touch frame. It should be noted that depending on the location difference, the processor may determine whether the touch frame will be discarded based upon two different methods. More particularly, if the first noise triggered signal is not located at the last transmitting/driving line of the touch frame, the processor counts the total number of noise triggered signals and considers the touch frame as a noise triggered touch frame if the total number of noise triggered signal is greater than a predetermined threshold. On the other hand, if the first noise triggered signal is located at the last transmitting/driving line of the touch frame, the processor may determine whether the touch frame will be discarded based upon a ratio method.

At step 630, if the first noise triggered signal is not located at the last transmitting/driving line of the touch frame, the processor starts to count the total number of noise triggered signals through scanning the rest of touch frame points.

At step 640, if the total number of noise triggered signals is greater than a threshold, which is about 40 according to an embodiment, the processor considers the touch frame as a noise triggered touch frame and discards the touch frame at step 650.

It should be noted while step 640 includes an absolute value threshold (e.g., 40), this threshold is merely an example, which should not unduly limit the scope of the claims. One of ordinary skill in the art would recognize many variations, alternatives, and modifications. For example, the threshold at step 640 may be replaced by a percentage. In particular, a percentage of noise triggered points over the total EFT samples may be used to evaluate whether the touch frame is a noise triggered false touch.

In accordance with an embodiment, the total EFT samples at step 630 may include two rows of touch points. The percentage threshold may be around 35%. In other words, if the percentage of noise triggered points is greater than 35%, the touch frame may be discarded accordingly.

On the other hand, at step 660, if the first noise triggered signal is located at the last transmitting/driving line of the touch screen panel, the processor calculates a percentage of noise triggered signals. In particular, the processor counts from the first noise triggered point to the last touch point of the last transmitting/driving line as the total samples. Furthermore, the processor uses the total noise triggered points divided by the total samples to calculate the percentage.

At step 670, if the percentage of noise triggered signals is greater than another threshold, which is about 60% according to an embodiment, the processor considers the touch frame as a noise triggered touch frame and drops the touch frame at step 680. It should be noted that the thresholds herein (e.g., 40 and 60%) are merely an example. These thresholds may vary in response to different design needs.

It should be noted that while FIG. 6 illustrate a method for detecting a noise triggered touch frame, a person having ordinary skill in the art will recognize many alternatives. For example, various step as illustrated in FIG. 6 may added, removed, replaced, rearranged, repeated, overlapped, and/or partially overlapped.

In sum, FIG. 6 shows the procedure of finding a noise triggered touch frame based upon raw data received by the processor. One advantageous feature of determining a noise triggered event based upon the raw data is that the processing time of filtering raw data can be saved because the processor will drop the touch frame without further processing the raw data. Such a simple algorithm is easy to implement and compatible with other algorithms including multiple touch detection, frequency selection noise elimination, infinite impulse response (IIR), auto calibration and/or the like.

In addition, the methods shown in FIG. 5 and FIG. 6 may be an optional portion of a touch screen algorithm. More particularly, the touch screen processor may detect the connection between the touch screen panel and external circuits such as battery chargers. Once a battery charger is coupled to the touch screen panel, the touch screen processor may enable the EFT noise reduction mechanisms shown above.

Figure 7:
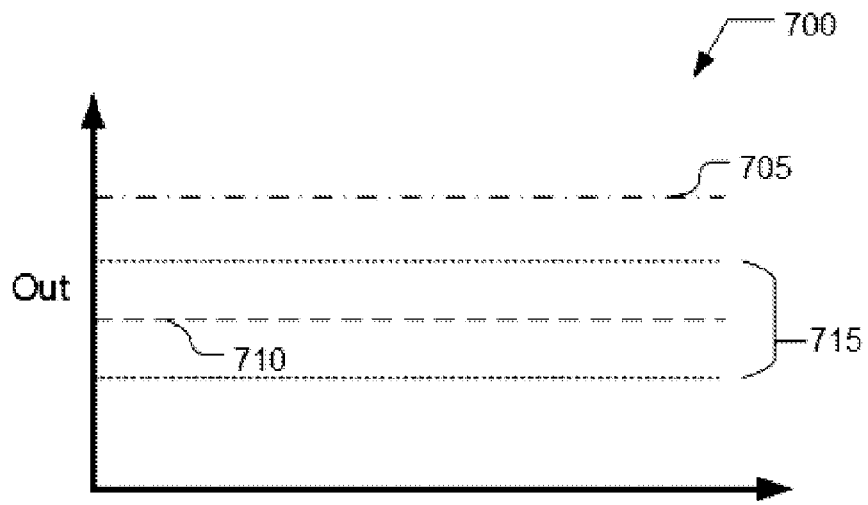
FIG. 7 illustrates a plot of output touch levels in accordance with an embodiment.

FIG. 7 illustrates plot 700 of output touch levels in accordance with an embodiment. Plot 700 includes baseline 705 for touch sensors in a touch screen panel. Plot 700 also includes EFT strength threshold 710 and hysteresis band 715. As described hereinabove in reference to FIGS. 2 and 3, hysteresis band 715 is around EFT strength threshold 710 as an embodiment hysteresis control mechanism. For example, EFT strength threshold 710 may be about 900 and hysteresis band 715 may range about −50 or about 50 around EFT strength threshold 710. Thus, hysteresis band 715 may extend in only one direction from EFT strength threshold 710 in some embodiments. Further, EFT strength threshold 710 is below baseline 705 for the touch sensors in the touch screen panel.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   in a frame period, scanning a touch screen panel from a first corner to a second corner, wherein the touch screen panel comprises a plurality of sensors arranged in rows and columns and the first corner is diagonally opposite to the second corner;
   determining whether a sensor is affected by electrical fast transient (EFT) noise;
   considering a frame as a noise influenced frame if a total number of sensors affected by EFT noise is greater than a first noise threshold;
   discarding the noise influenced frame without further processing;
   finding a first noise influenced sensor;
   determining whether the first noise influenced sensor is located at a last transmitting/driving line of the touch screen panel;
   determining whether a frame is a noise influenced frame by a second noise threshold;
   finding all noise influenced sensors in the last transmitting/driving line of the touch screen panel;
   calculating a percentage equal to the number of noise influenced sensors divided by the number of samples between the first noise influenced sensor and a last sensor of the last transmitting/driving line of the touch screen panel; and
   considering the frame as a noise influenced frame if the percentage is greater than 60%.

2. The method of claim 1, wherein:
   the first corner is an upper left corner; and
   the second corner is a bottom right corner.

3. The method of claim 1, wherein determining whether a sensor is affected by EFT noise further comprises:
   setting a first threshold and a first hysteresis band, wherein the first threshold is less than a baseline of the touch screen panel;
   comparing a signal generated by the sensor with the first threshold; and
   labeling the sensor as a noise influenced sensor if signal strength of the signal exceeds the first threshold.

4. The method of claim 3, wherein:
   the baseline is about 1000;
   the first threshold is about 900; and
   the first hysteresis band is from 900 to 950.

5. The method of claim 1, wherein:
   the first noise threshold is 40.

6. A method comprising:
   during a frame period, finding a first EFT noise influenced sensor of a touch screen panel;
   determining whether the first EFT noise influenced sensor is located at a last transmitting/driving line of the touch screen panel;
   designating the frame period as a noise influenced frame period using an absolute value threshold if the first EFT noise influenced sensor is not located at the last transmitting/driving line; and
   designating the frame period as the noise influenced frame period using a percentage threshold if the first EFT noise influenced sensor is located at the last transmitting/driving line, wherein designating the frame period as the noise influenced frame period using a percentage threshold comprises:
      finding a first EFT triggered touch point in a last transmitting/driving line of a touch frame;
      calculating a percentage of EFT triggered touch points over a sample from the first EFT triggered touch point to a last touch point of the last transmitting/driving line of the touch frame; and
      discarding the touch frame if the percentage of EFT triggered touch points is greater than the percentage threshold.

7. The method of claim 6, further comprising:
   receiving raw signals from the touch screen panel; and
   finding a first EFT noise influenced signal based upon a first predetermined threshold.

8. The method of claim 7, wherein:
   the first predetermined threshold is a capacitance variation from a baseline of the touch screen panel.

9. The method of claim 8, wherein:
   the first predetermined threshold is 900 when a baseline of the touch screen panel is 1000.

10. The method of claim 9, further comprising:
    a hysteresis band around the first predetermined threshold.

11. The method of claim 6, further comprising:
    finding a first EFT triggered touch point from a touch frame;
    counting a total number of EFT triggered touch points; and
    dropping the touch frame if the total number of EFT triggered touch points is greater than the absolute value threshold.

12. The method of claim 6, wherein:
    the percentage threshold is about 60%.

13. The method of claim 6, wherein designating the frame period as the noise influenced frame period using the percentage threshold further comprises designating the frame period as the noise influenced frame period when 60% or more of a sampled group of sensors are noised influenced.

14. The method of claim 6, wherein the percentage threshold is 60%.

15. A system comprising:
    a touch screen panel comprising a plurality of sensors arranged in rows and columns, wherein each sensor comprises:
       a transmit node; and
       a receive node, wherein the transmit node and the receive node form a capacitor;
    a receiver coupled to the receive node; and
    a processor coupled to the receiver, wherein the processor is configured to:
       find a first EFT noise influenced sensor of the touch screen panel;
       determine whether the first EFT noise influenced sensor is located at a last transmitting/driving line of the touch screen panel;
       designate a touch frame as a noise influenced frame using an absolute value threshold if the first EFT noise influenced sensor is not located at the last transmitting/driving line;

designate the touch frame as the noise influenced frame using a percentage threshold if the first EFT noise influenced sensor is located at the last transmitting/driving line; and calculate a percentage equal to the number of noise influenced sensors divided by the number of samples between a first sensor and a last sensor of the last transmitting/driving line of the touch screen panel and wherein the touch frame is designated as a noise influenced frame when the percentage is greater than 60%.

16. A system comprising:

a touch screen panel comprising a plurality of sensors arranged in rows and columns, wherein each sensor comprises:
  a transmit node; and
  a receive node, wherein the transmit node and the receive node form a capacitor;

a receiver coupled to the receive node; and a processor coupled to the receiver, wherein the processor is configured to:
  find a first EFT noise influenced sensor of the touch screen panel;
  determine whether the first EFT noise influenced sensor is located at a last transmitting/driving line of the touch screen panel;
  designate a touch frame as a noise influenced frame using an absolute value threshold if the first EFT noise influenced sensor is not located at the last transmitting/driving line; and
  designate the touch frame as the noise influenced frame using a percentage threshold if the first EFT noise influenced sensor is located at the last transmitting/driving line, wherein designating the touch frame as the noise influenced frame using a percentage threshold comprises:
  calculating a percentage of EFT noise influenced sensors over a sample from the first EFT noise influenced sensor to a last EFT noise influenced sensor of the last transmitting/driving line of the touch screen panel for the touch frame;
  comparing the percentage of EFT noise influenced sensors with the percentage threshold; and
  discarding the touch frame if the percentage of EFT noise influenced sensors is greater than the percentage threshold.

17. The system of claim 16, wherein:
the processor receives raw data from the touch screen panel through the receiver.

18. The system of claim 16, wherein:
the touch frame is of 12 rows and 20 columns.

19. The system of claim 16, wherein:
the absolute value threshold is about 40; and
the percentage threshold is about 60%.

20. The system of claim 16, wherein:
the processor finds the first EFT noise influenced sensor by measuring signal strength of a signal generated by the first EFT noise influenced sensor.

\* \* \* \* \*